(12) United States Patent
Maeno

(10) Patent No.: US 10,296,002 B2
(45) Date of Patent: May 21, 2019

(54) AUTONOMOUS MOVEMENT DEVICE, AUTONOMOUS MOVEMENT METHOD, AND NON-TRANSITORY RECORDING MEDIUM

(71) Applicant: CASIO COMPUTER CO., LTD., Shibuya-ku, Tokyo (JP)

(72) Inventor: Yasushi Maeno, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1 day.

(21) Appl. No.: 15/359,689

(22) Filed: Nov. 23, 2016

(65) Prior Publication Data

US 2017/0261985 A1    Sep. 14, 2017

(30) Foreign Application Priority Data

Mar. 14, 2016  (JP) ................. 2016-049350

(51) Int. Cl.
  *G05D 1/00*    (2006.01)
  *G05D 1/02*    (2006.01)

(52) U.S. Cl.
  CPC ......... *G05D 1/0088* (2013.01); *G05D 1/0246* (2013.01); *G05D 1/0253* (2013.01);
  (Continued)

(58) Field of Classification Search
  CPC .. G05D 1/0088; G05D 1/0253; G05D 1/0274; G05D 2201/0203; G05D 2201/0207; G05D 2201/0214
  See application file for complete search history.

(56) References Cited

U.S. PATENT DOCUMENTS 5,378,969 A   1/1995 Haikawa et al.
6,466,866 B1  10/2002 Sato
(Continued)

FOREIGN PATENT DOCUMENTS

JP   05297940 A    11/1993
JP   2004005593 A   1/2004
(Continued)

OTHER PUBLICATIONS

NPL: "SLAM for Dummies" by Soren Riisgaard and Morten Rufus Blas As accessed by the WayBackMachine.org (first published on Nov 8, 2010) http://web.archive.org/web/20101108065724/https://ocw.mit.edu/courses/aeronautics-and-astronautics/16-412j-cognitive-robotics-spring-2005/projects/1aslam_blas_repo.pdf (Year: 2010).*

(Continued)

*Primary Examiner* — Thomas E Worden
(74) *Attorney, Agent, or Firm* — Holtz, Holtz & Volek PC

(57) ABSTRACT

The movement direction-and-speed determiner of an autonomous movement device determines the direction and speed for an autonomous movement based on information on the plurality of picked-up images by an image picker. A feature point obtainer obtains a feature point from the picked-up image by the image picker. A map memory stores the position of the obtained feature point by the feature point obtainer. A corresponding feature-point number obtainer obtains the number of correspondences between the obtained feature point by the feature point obtainer and the feature point having the position stored in the map memory. When the obtained number of corresponding feature points by the corresponding feature-point number obtainer is equal to or smaller than a threshold, in order to increase the number of corresponding feature points, a moving direction-and-speed changer changes the moving direction and speed to those determined by the movement direction-and-speed determiner.

12 Claims, 9 Drawing Sheets

(52) U.S. Cl.
CPC ... *G05D 1/0274* (2013.01); *G05D 2201/0203* (2013.01); *G05D 2201/0207* (2013.01); *G05D 2201/0214* (2013.01)

(56) References Cited

U.S. PATENT DOCUMENTS

| | | | |
|---|---|---|---|
| 9,714,841 B2 | 7/2017 | Toda et al. | |
| 9,739,215 B2 | 8/2017 | Martin et al. | |
| 9,773,335 B2* | 9/2017 | Koga | G06T 11/60 |
| 2009/0028387 A1* | 1/2009 | Jeong | G06K 9/00664 382/103 |
| 2009/0096686 A1 | 4/2009 | Niculescu et al. | |
| 2009/0254236 A1* | 10/2009 | Peters, II | G05D 1/0221 701/28 |
| 2010/0145550 A1* | 6/2010 | Ross-Martin | G05D 1/0234 701/2 |
| 2011/0044504 A1* | 2/2011 | Oi | G06T 7/73 382/103 |
| 2011/0054689 A1* | 3/2011 | Nielsen | G05D 1/0088 700/258 |
| 2011/0106450 A1 | 5/2011 | Toda et al. | |
| 2012/0188237 A1* | 7/2012 | Han | A63F 13/10 345/419 |
| 2012/0230550 A1 | 9/2012 | Kraut | |
| 2012/0239191 A1* | 9/2012 | Versteeg | G06N 3/004 700/246 |
| 2013/0103405 A1 | 4/2013 | Namba et al. | |
| 2013/0138246 A1 | 5/2013 | Gutmann et al. | |
| 2014/0225919 A1* | 8/2014 | Kaino | G06T 19/006 345/633 |
| 2014/0350839 A1* | 11/2014 | Pack | G01C 21/30 701/409 |
| 2015/0262361 A1 | 9/2015 | Lo et al. | |
| 2016/0089783 A1* | 3/2016 | Noh | G06K 9/00671 382/153 |
| 2016/0147230 A1 | 5/2016 | Munich et al. | |
| 2016/0180533 A1 | 6/2016 | Pavani et al. | |
| 2016/0334885 A1 | 11/2016 | Togawa et al. | |
| 2017/0098375 A1* | 4/2017 | Smart | G08G 1/143 |
| 2017/0148167 A1* | 5/2017 | Aratani | G06T 7/0042 |
| 2017/0164447 A1* | 6/2017 | Rogers | G06F 3/03 |
| 2017/0174227 A1* | 6/2017 | Tatourian | G06K 9/00805 |
| 2017/0178331 A1* | 6/2017 | Narikawa | G05D 1/0246 |

FOREIGN PATENT DOCUMENTS

| | | |
|---|---|---|
| JP | 2004276168 A | 10/2004 |
| JP | 2008059218 A | 3/2008 |
| JP | 2008071352 A | 3/2008 |
| JP | 2008090575 A | 4/2008 |
| JP | 2009169845 A | 7/2009 |
| JP | 2009193240 A | 8/2009 |
| JP | 2010288112 A | 12/2010 |
| JP | 2011048706 A | 3/2011 |
| JP | 2012089174 A | 5/2012 |
| JP | 2012216051 A | 11/2012 |
| JP | 2014186694 A | 10/2014 |
| JP | 2015146091 A | 8/2015 |

OTHER PUBLICATIONS

NPL: "Fast Keypoint Recognition using Random Ferns" by Oezuysal et al. https://cvlab.epfl.ch/files/content/sites/cvlab2/files/publications/publications/2010/OzuysalCLF10.pdf (Year: 2010).*

Japanese Office Action dated Apr. 4, 2017 issued in counterpart Japanese Application No. 2016-049350.

Andrew J. Davison, "Real-Time Simultaneous Localisation and Mapping with a Single Camera", Proceedings of the 9th IEEE International Conference on Computer Vision vol. 2, 2003, pp. 1403-1410.

Related U.S. Appl. No. 15/269,917, filed Sep. 19, 2016, First Named Inventor: Tetsuro Narikawa, Title: "Autonomous Movement Device, Autonomous Movement Method and Non-Transitory Recording Medium".

Related U.S. Appl. No. 15/276,320, filed Sep. 26, 2016, First Named Inventor: Mitsuyasu Nakajima, Title: "Autonomous Movement Device, Autonomous Movement Method and Non-Transitory Recording Medium".

Related U.S. Appl. No. 15/278,627, filed Sep. 28, 2016, First Named Inventor: Tetsuro Narikawa, Title: "Autonomous Movement Device, Autonomous Movement Method and Non-Transitory Recording Medium".

Richard Hartley, et al., "Multiple View Geometry in Computer Vision", Second Edition, Mar. 2004, chapter 9.

Tomokazu Sato, "Sequential Three-dimensional Reproduction from Motion Image by Feature Point Tracking, and Application Thereof, from Basics of Coordinate System to Application Case Examples and Recent Research Tendency", Image Sensing Symposium Tutorial.

Benavidez, et al., "Cloud-based realtime robotic visual slam", InSystems Conference (SysCon), 2015 9th Annual IEEE International Apr. 13, 2015, pp. 773-777, IEEE.

* cited by examiner

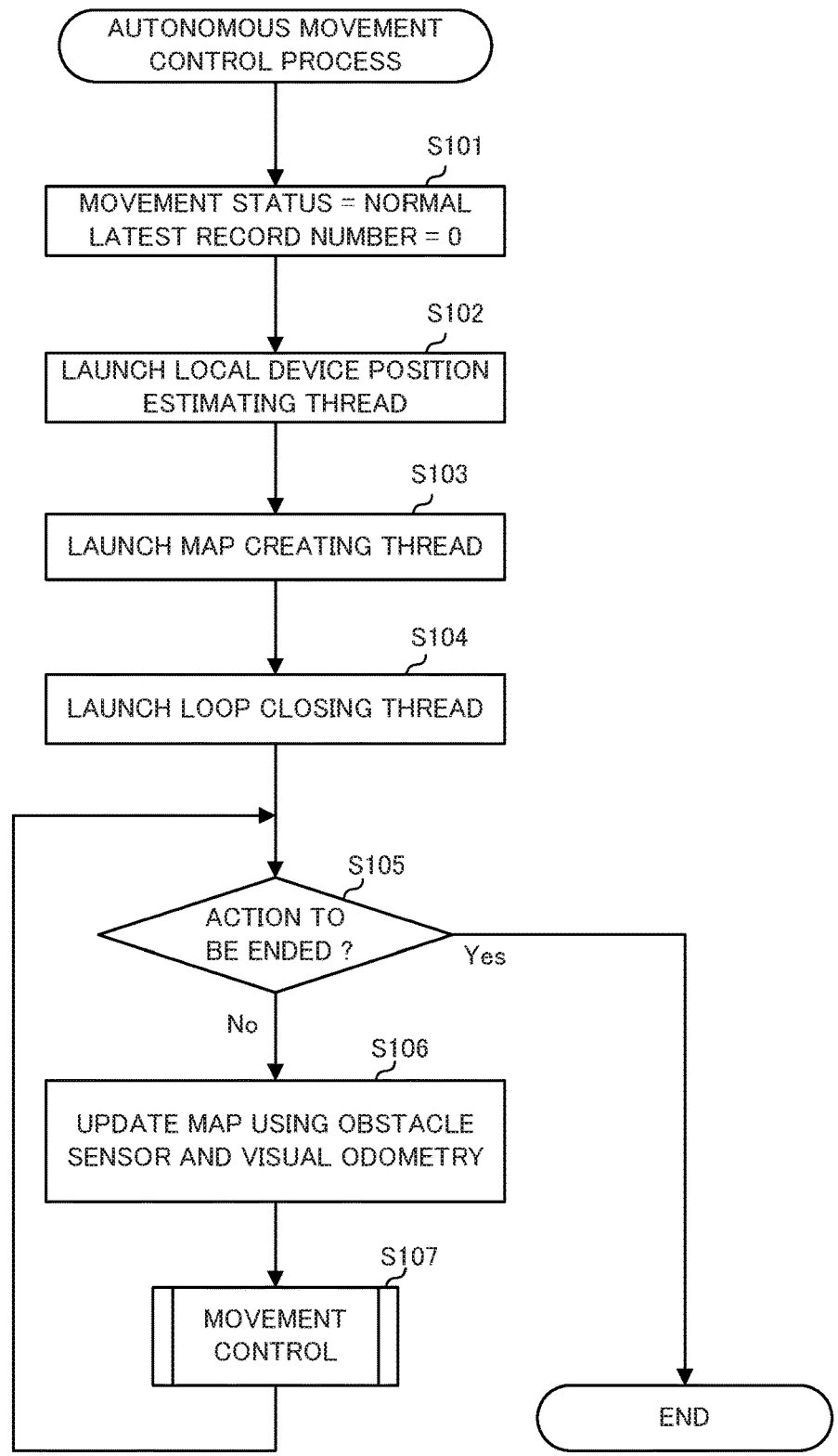

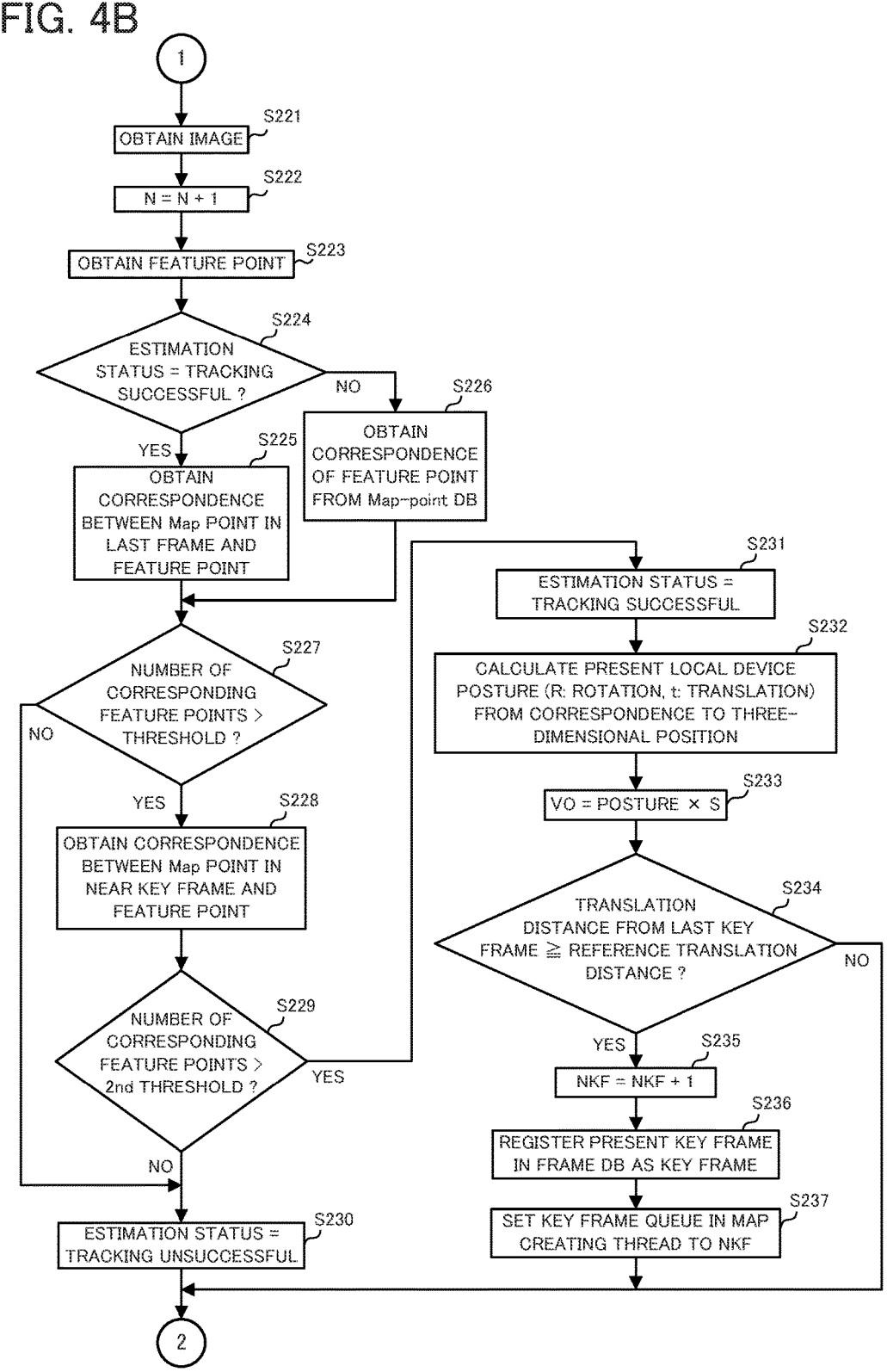

AUTONOMOUS MOVEMENT DEVICE, AUTONOMOUS MOVEMENT METHOD, AND NON-TRANSITORY RECORDING MEDIUM

CROSS-REFERENCE TO RELATED APPLICATION

This application claims the benefit of Japanese Patent Application No. 2016-049350, filed on Mar. 14, 2016, the entire disclosure of which is incorporated by reference herein.

FIELD

This application relates generally to an autonomous movement device, an autonomous movement method and a non-transitory recording medium.

BACKGROUND

Autonomous movement devices that autonomously move in accordance with an application are becoming popular. For example, autonomous movement devices that autonomously move for the purpose of indoor space cleaning are known. In general, as for such autonomous movement devices, creation of a map in an actual space and estimation of the local device position in the real space are necessary.

As for the scheme of creating a map in the actual space, for example, a Simultaneous Localization And Mapping (SLAM) scheme has been known. The basic principle of the SLAM technology using a monocular camera is disclosed in Non Patent Literature 1 and Non Patent Literature 2, and by tracking the same feature point from the multiple frames of a motion image picked up by the camera, a process of alternately estimating the three-dimensional position of the local device (camera position) and the three-dimensional position of the feature point (this is collected up to form map information) is executed.

According to this scheme, since the local device position and the three-dimensional position of the feature point are alternately estimated, an error accumulation occurs. Hence, even if a looped movement, or the like is performed to return to the original position, devices are sometimes unable to recognize the return to the original position. As for a scheme of correcting such an error accumulation, there is known a technology called a loop closing process (a loop resolution process) that is disclosed in Non Patent Literature 3. According to this loop closing process, when the local device detects a loop (when the local device detects that the picked-up frame is similar to the frame picked up in past), the local device estimates the position at that past time as a proper position, and corrects the positions on the route reaching the present position from the estimated proper position, thereby reducing the error.

Non Patent Literature 1 Andrew J. Davison, "Real-Time Simultaneous Localization and Mapping with a Single Camera", Proceedings of the 9th IEEE International Conference on Computer Vision Volume 2, 2003, pp. 1403-1410

Non Patent Literature 2 Richard Hartley, Andrew Zisserman, "Multiple View Geometry in Computer Vision", Second Edition, Cambridge. University Press, March 2004, chapter 9

Non Patent Literature 3 NARA INSTITUTE OF SCIENCE AND TECHNOLOGY, Information Science, Associate Professor SATO Tomokazu, "SSII2015 Tutorial, Sequential Three-dimensional Reproduction from Motion Image by Feature Point Tracking, and Application Thereof, from Basics of Coordinate System to Application Case Examples and Recent Research Tendency", [online], Jun. 10, 2015, Image Sensing Symposium Tutorial Lecture Meeting, [searched on Feb. 22, 2016], Internet <URL: http://yokoya.naist.jp/paper/datas/1407/SSII%E3%83%81%E3%83%A5%E3%83%BC%E3%83%88%E3%83%AA%E3%82%A2%E3%83%AB%E4%BD%90%E8%97%A4.pdf>

SUMMARY

In order to accomplish the above objective, an autonomous movement device according to an aspect of the present disclosure includes:

a movement controller controlling an autonomous movement based on information on a plurality of images picked up by an image picker;

a feature point obtainer obtaining a feature point from the image picked up by the image picker;

a map memory storing a position of the feature point obtained by the feature point obtainer; and a corresponding feature-point number obtainer obtaining a corresponding feature point number that is a number of correspondences between the feature point obtained by the feature point obtainer and the feature point with the position stored in the map memory, in which the movement controller controls the movement in accordance with the corresponding feature point number obtained by the corresponding feature-point number obtainer.

BRIEF DESCRIPTION OF THE DRAWINGS

A more complete understanding of this application can be obtained when the following detailed description is considered in conjunction with the following drawings, in which:

FIG. 3 is a flowchart for an entire autonomous movement control process according to the embodiment;

FIG. 4B is a second flowchart for a process in a local device position estimating thread of the autonomous movement control process according to the embodiment;

DETAILED DESCRIPTION

Figure 1:
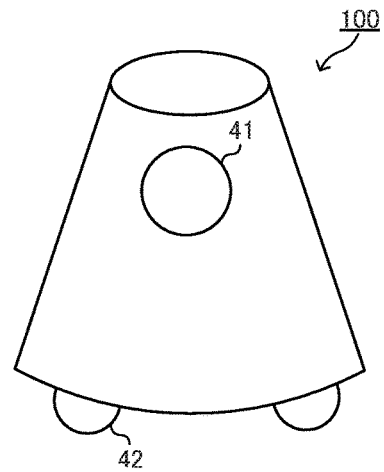
FIG. 1 is a diagram illustrating an external appearance of an autonomous movement device according to an embodiment.

An explanation will be given of an autonomous movement device according to an embodiment of the present disclosure with reference to FIG. 1. An autonomous movement device 100 autonomously moves in accordance with an application. Example applications are security and monitoring, indoor cleaning, pet up-keeping, and plaything.

The autonomous movement device 100 includes, as an external appearance, an image picker 41 and a driver 42.

The image picker 41 includes a monocular imaging device (camera). The image picker 41 obtains an image (frame) at, for example, 30 fps. The autonomous movement device 100 performs autonomous movement while recognizing the local device position and the surrounding environment in a real-time manner based on the images sequentially obtained by the image picker 41.

The driver 42 is a moving device which is an independent two-wheel drive type, and which includes wheels and a motor. The autonomous movement device 100 is capable of parallel movement (translation movement) in the back-and-forth direction by the two wheels driven in the same direction, of rotating (direction change) at the present location by the two wheels driven in the opposite directions, and of turning (translation movement+rotation (direction change) movement) by the two wheels driven at respective speeds changed differently. In addition, each wheel is provided with a rotary encoder which measures the number of rotations of the wheel, and is capable of calculating a translation movement amount and a rotation amount by utilizing a geometric relationship, such as the diameter of the wheel, the distance between the wheels, and the like. When, for example, the diameter of the wheel is D, and the number of rotations is R (which is measured by the rotary encoder), the translation movement amount of this wheel at the floor contacting part can be defined as $\pi \times D \times R$. In addition, when the diameter of the wheel is D, the distance between the wheels is I, the number of rotations by the right wheel is $R_R$, and the number of rotations by the left wheel is $R_L$, the rotation amount for direction change can be defined as (when a clockwise rotation is defined as a positive rotation) 360 degrees$\times D \times (R_L - R_R)/(2 \times I)$. By accumulating those translation movement amount and rotation amount in sequence, the driver 42 functions as a so-called odometry which is capable of measuring the local device position (the position and the direction with reference to the position and the direction at the start of movement).

Note that crawlers may be applied instead of the wheels, and a movement may be made by multiple (for example, two) walking legs. In those cases, like the case of the wheels, the local device position and the direction are measurable based on the movement of the two crawlers and that of the legs.

Figure 2:
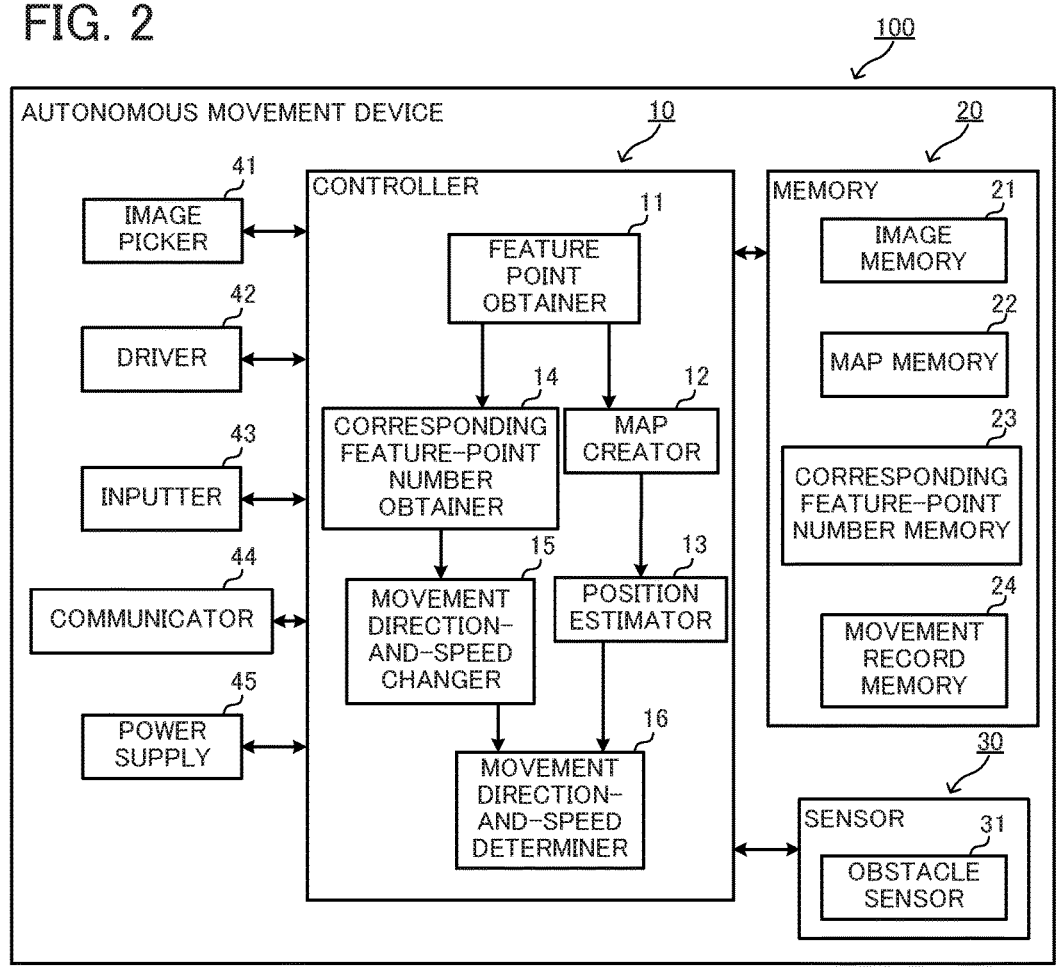
FIG. 2 is a diagram illustrating a structure of the autonomous movement device according to the embodiment.

As illustrated in FIG. 2, the autonomous movement device 100 includes, in addition to the image picker 41 and the driver 42, a controller 10, a memory 20, a sensor 30, an inputter 43, a communicator 44, and a power supply 45.

The controller 10 includes a Central Processing Unit (CPU) and the like, executes a program stored in the memory 20, thereby accomplishing the functions of respective components (a feature point obtainer 11, a map creator 12, a position estimator 13, a corresponding feature-point number obtainer 14, a movement direction-and-speed changer 15, and a movement direction-and-speed determiner 16) to be explained later. The controller 10 also includes a timer (not illustrated), which can count elapsed time.

The memory 20 includes a Read Only Memory (ROM), a Random Access Memory (RAM), and the like, and includes an image memory 21, a map memory 22, a corresponding feature-point number memory 23, and a movement record memory 24. The ROM stores programs (for example, programs relating to calculation by an SLAM scheme to be explained later and autonomous movement control process) to be executed by the CPU of the controller 10, and necessary data in order to execute the programs. The RAM stores data to be created and changed during the execution of the programs.

The image memory 21 stores images picked up by the image picker 41. However, in order to save the memory capacity efficiently, only some of the picked-up images may be stored, or a feature quantity of the image may be stored instead of the image itself. As for the important image (a key frame to be explained later), the image memory 21 stores information on the important image picked up by the image picker 41 associated with information on the local device position (the position of the local device and the direction thereof) when the image is picked up.

The map memory 22 stores a map (information on the three-dimensional position of a feature point and that of an obstacle) created by the map creator 12 based on the SLAM scheme to be explained later and information from an obstacle sensor 31.

The feature-point correspondence-number memory 23 stores the number of correspondences between the feature point in the image picked up by the image picker 41 in a local device position estimating thread to be explained later, and the Map point stored in the map memory 22.

The movement record memory 24 stores the records of the movement direction and of the movement distance. Instead of the movement direction and the movement distance, the records of the three-dimensional position of the local device and of the direction thereof may be stored. The movement record memory 24 is a last-in and first-out type stack memory. In this case, the number of stored records is equivalent to the value of the stack pointer of the movement record memory 24.

The sensor 30 includes the obstacle sensor 31. The obstacle sensor 31 detects an obstacle while the autonomous movement device 100 is moving, and is, for example, an infrared sensor or an ultrasound sensor. Note that the obstacle may be detected using the image picker 41 instead of applying the individual obstacle sensor 31. In addition, an unillustrated bumper sensor that detects a collision with other objects, an unillustrated angular sensor and an unillustrated acceleration sensor both detecting a motion may be applied.

Operation buttons that are the inputter 43 to operate the autonomous movement device 100 are provided. The operation buttons include, for example, a power button, a mode change button (to change the modes, such as a cleaning mode and a pet-keeping mode), and an initialize button (to start over map creation). As the inputter 43, an unillustrated microphone to input sound, and a sound recognizer that recognizes the speech operation instruction to the autonomous movement device 100 may be provided.

The communicator 44 is a module for a communication with an external device, and is a wireless module including an antenna when a wireless communication with the external device is performed. An example communicator 44 is a wireless module for a short-range wireless communication based on the Bluetooth®. The communicator 44 exchanges data between the autonomous movement device 100 and the external device. When a destination instruction is given to the autonomous movement device 100, information on the destination is transmitted via this communicator 44.

The power supply 45 is a source of power to actuate the autonomous movement device 100, and in general, is built-in rechargeable batteries, but may be solar batteries or a system to which power is wirelessly supplied from the floor surface. When the power supply 45 is rechargeable batteries, charging is performed by a charging station (home base) with which the autonomous movement device 100 is docked.

Next, functions of the controller 10 will be explained. The controller 10 includes the feature point obtainer 11, the map creator 12, the position estimator 13, the corresponding feature-point number obtainer 14, the movement direction-and-speed changer 15, and the movement direction-and-speed determiner 16, and performs an arithmetic operation by the SLAM scheme to be explained later, a movement control to the autonomous movement device 100, and the like. In addition, the controller 10 is compatible with a multi-thread function, and is capable of simultaneously executing multiple threads (different process flows).

The feature point obtainer 11 obtains a two-dimensional feature point in the picked up image by the image picker 41. The two-dimensional feature point is a characteristic part within the image like an edge part in the image, and is obtainable using algorithms, such as Scale-Invariant Future Transform) SIFT, and Speed-Up Robust Features (SURF).

The map creator 12 stores, in the map memory 22 as map information, a three-dimensional position of a feature point (Map point) estimated by the SLAM scheme based on information on the image stored in the image memory 21 and information on the local device position and the direction when the image is picked up, and a three-dimensional position of an obstacle obtained based on information on the local device position and the direction when the obstacle sensor 31 detects the obstacle.

The position estimator 13 estimates, as a visual odometry, the local device position and the direction based on the SLAM scheme to be explained later.

The corresponding feature-point number obtainer 14 obtains the number of correspondences between the obtained feature point by the feature point obtainer 11, and the stored Map point in the map memory 22.

The movement direction-and-speed changer 15 decreases the moving speed of the local device, stops the local device, and changes the movement direction in accordance with the corresponding feature point number obtained by the corresponding feature-point number obtainer 14. This action increases the number of corresponding feature points.

The movement direction-and-speed determiner 16 determines the moving speed of the local device and the movement direction thereof. The controller 10 controls the driver 42 in accordance with those determined moving speed and movement direction. Note that the movement direction-and-speed changer 15 and the movement direction-and-speed determiner 16 correspond to a movement controller.

The main flow of the autonomous movement process by the autonomous movement device 100 will be explained with reference to FIG. 3. First, the controller 10 sets "normal" that is an initial value to a movement status variable, and sets 0 that is an initial value to the latest record number (step S101). The movement status variable and the latest record number are both variables applied for the movement control in step S107, and the details will be explained in the explanation for the movement control. Next, the controller 10 launches (step S102) a local device position estimating thread. In addition, the controller 10 launches (step S103) a map creating thread. Still further, the controller 10 launches (step S104) a loop closing thread. The launched local device position estimating thread and the map creating thread start creating information on the map and a visual odometry (information on the local device position estimated based on the map and the image) based on the SLAM scheme. Subsequently, the controller 10 determines (step S105) whether or not to end the action, and when the action is to be ended (step S105: YES), the controller 10 ends the action. Conversely, when the action is not to be ended (step S105: NO), the controller 10 updates (step S106) the map using the obstacle sensor 31 and the visual odometry.

Next, the controller 10 performs movement control (step S107) so as to give an action instruction to the driver 42 for the autonomous movement, and returns the process to the step S105. The autonomous movement in this case may be a movement like moving around the room entirely to create the map, or may be a movement along the shortest route to the instructed destination when the movement to the destination is instructed. In addition, a task (for example, re-creation of map, cleaning, pet up-keeping) may be instructed although a clear destination is not instructed, and the destination may be set case by case in accordance with the surrounding situation and the instructed task.

By the process through the main flow, the autonomous movement device 100 is capable of autonomously moving based on the map information, and updating the map information as appropriate. As a typical example, first, when the power supply 45 is activated with the autonomous movement device 100 being located at the charging station, the autonomous movement device 100 moves each room of a housing entirely with the aid of the obstacle sensor 31, specifies the position of an obstacle like a wall by the obstacle sensor 31, and creates the map information containing the position of the obstacle. When the map is created to some level, an area which has the map information not created yet but which can be estimated as a movable area for the autonomous movement device 100 becomes apparent. Hence, the autonomous movement device 100 may autonomously move to this area to create the map of a further wide range. Next, when map information on substantially all movable ranges for the autonomous movement device 100 is created, the autonomous movement device 100 is enabled to efficiently move based on the map information. For example, the autonomous movement device 100 becomes able to return to the charging station with the shortest route from any position in any room, and to clean the room efficiently.

Figure 4A:
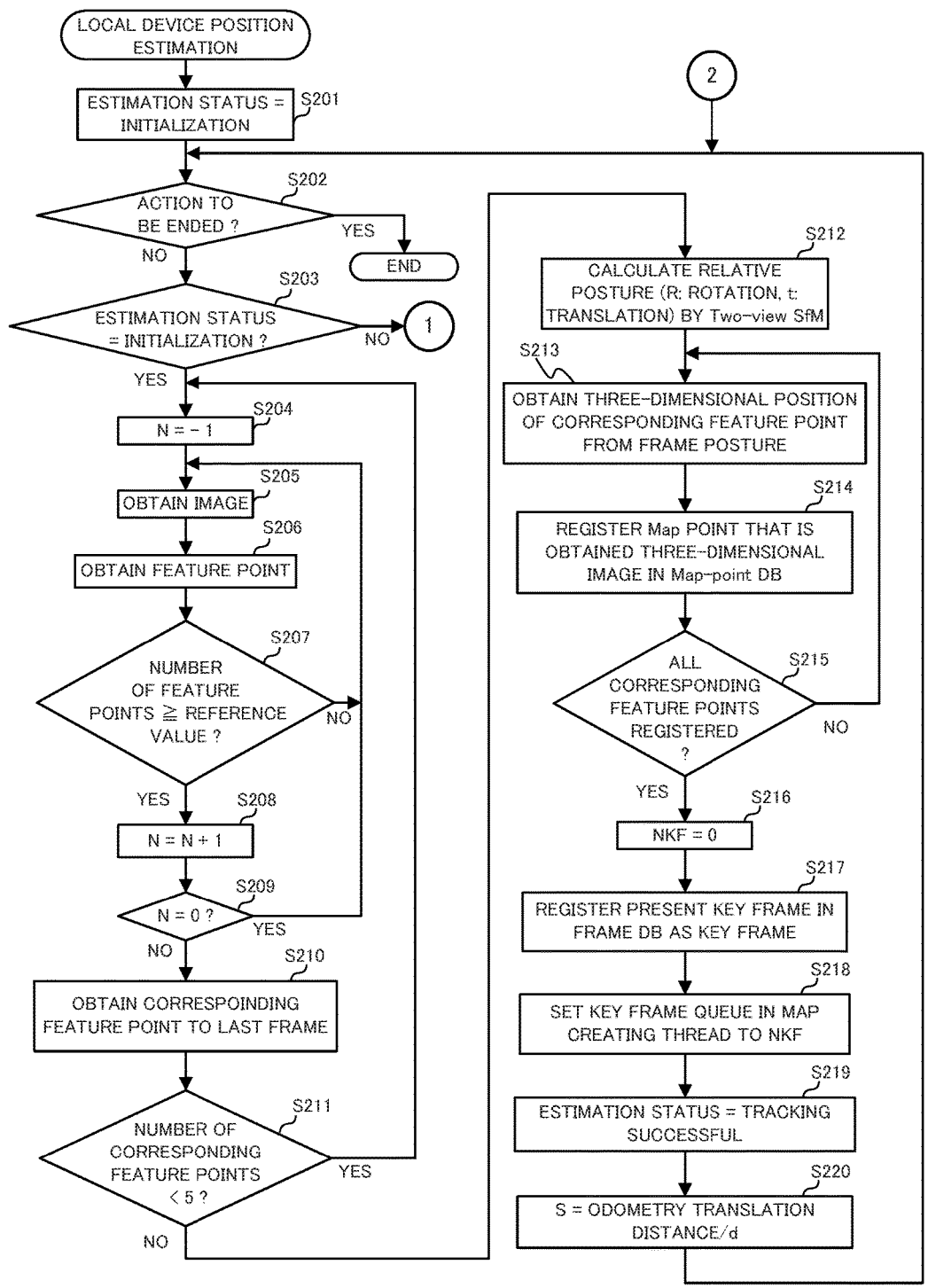
FIG. 4A is a first flowchart for a process in a local device position estimating thread of the autonomous movement control process according to the embodiment.

The local device position estimating thread launched in the step S102 in the main flow (see FIG. 3) for the autonomous movement device 100 will be explained with reference to FIG. 4A and FIG. 4B. This thread is a process of causing the position estimator 13 to execute an initializing process at first, and then continuing the local device position estimation (the local device position is estimated by the visual odometry using the image obtained by the image picker 41).

First, the position estimator 13 sets (step S201) an estimation status variable to "initialization". The estimation status variable indicates the status of the local device position estimating process at this time point, and takes any of three values that are "initialization", "tracking successful", and "tracking unsuccessful". Next, the position estimator 13 determines (step S202) whether or not to end the action. When the action is to be ended (step S202: YES), the position estimator 13 ends the action, and when the action is not to be ended (step S202: NO), the position estimator 13 determines (step S203) whether or not the estimation status variable indicates "initialization". When the estimation status variable does not indicate "initialization" (step S203: NO), the local device position estimating process subsequent to step S221 is executed, and when such a variable indicates "initialization" (step S203: YES), the position estimator 13 progresses the process to step S204, and executes an initializing process. First, this initializing process will be explained.

In the initializing process, first, the position estimator 13 sets (step S204) a frame counter N to be −1, and the image picker 41 picks up (step S205) the image. The image can be picked up at, for example, 30 fps (the obtained image is also called a frame). Next, the feature point obtainer 11 obtains (step S206) the two-dimensional feature point contained in the picked-up image by the image picker 41.

When the number of obtained two-dimensional feature points is small, a calculation based on a Two-view Structure from Motion scheme to be explained later is not executable, and thus the position estimator 13 compares, in step S207, the number of obtained two-dimensional feature points with a reference value (for example, 10). When the number of obtained two-dimensional feature points is less than the reference value (step S207: NO), the position estimator 13 returns the process to the step S205, and the obtainment of the image and the obtainment of the two-dimensional feature point are repeated until the number of obtained two-dimensional feature points becomes equal to or greater than the reference value. At this stage, although the map information has not been created yet, for example, in the above-explained typical case, the autonomous movement device 100 has started moving each rooms of the housing entirely with the aid of the obstacle sensor 33. Accordingly, when the obtainment of the image and the obtainment of two-dimensional feature point are repeated in this initializing process, the image obtainment is repeated while the autonomous movement device 100 is moving. Hence, various images are obtainable, and image obtainment with a large number of two-dimensional feature points in future is expected.

When the number of obtained two-dimensional feature points is equal to or greater than the reference value (step S207: YES), the position estimator 13 increments (step S208) the frame counter N. Next, the position estimator 13 determines (step S209) whether or not the frame counter N is zero. When the frame counter N is zero (step S209: YES), this means that only a single image has been obtained, and thus the position estimator 13 returns the process to the step S205 in order to obtain the second image. Although not illustrated in the flowchart that is FIG. 4A, when the local device position at the time of the obtainment of the first image and the local device position at the time of the obtainment of the second image are apart from each other to some level, the precision for a posture estimation in the subsequent process improves. Hence, when the process returns from the step S209 to the step S205, a stand-by process until the translation distance by the odometry in accordance with an action instruction to the driver 42 in the step S107 in the main flow (see FIG. 3) becomes equal to or greater than a predetermined distance (for example, 1 m) may be added, and then the process may return to the step S205.

When the frame counter N is not zero (step S209: NO), this indicates that the two images have been already obtained, and the position estimator 13 obtains (step S210) the correspondence of the two-dimensional feature point between the two images (the consistent point in the actual environment is present in the respective images, and the correspondence is obtainable). When the number of corresponding feature points is less than five, the posture estimation between the two images to be explained later is not executable, and thus the position estimator 13 determines (step S211) whether or not the number of corresponding feature points is less than five. When the number of corresponding feature points is less than five (step S211: YES), in order to start over the obtainment of the initial image, the process returns to the step S204. When the number of corresponding feature points is equal to or greater than five (step S211: NO), the posture between the two images (the difference between the positions where the respective images are obtained (translation vector t) and the difference in directions (rotation matrix R)) are estimatable (step S212 by the Two-view Structure from Motion scheme to be explained later.

As for this posture estimation by this Two-view Structure from Motion scheme, more specifically, a basic matrix E is obtained from the corresponding feature points, and the basic matrix E is decomposed into the translation vector t and the rotation matrix R to obtain the estimation (see Non Patent Literature 2 for detail). The value of each element in the translation vector t to be obtained in this case (when a movement in the three-dimensional space is expected, with the position where the first image is obtained being as an origin, three elements that are X, Y, Z are present) differs from the value in the actual environment (according to the Two-view Structure from Motion scheme, the value in the actual environment itself is not obtainable, and a value in a similar space to the actual environment is to be obtained). Hence, such a value is considered as the value in the SLAM space, and the following explanation will be given with reference to the coordinates in the SLAM space (SLAM coordinate system).

When the posture (the translation vector t and the rotation matrix R) between the two images is obtained, the value thereof indicates the posture of the second image (the local device position (translation vector t) and the direction (rotation matrix R) when the second image is obtained) with reference to the first image (the position where the first image is obtained is defined as the origin of the SLAM coordinate system, the translation vector is zero vector, and the rotation matrix is a unit matrix I). In this case, when the postures of the respective two images (the local device position (translation vector t) and the direction (rotation matrix R) when the image (frame) is obtained, also referred to as a frame posture) have been obtained, the map creator 12 obtains (step S213) a three-dimensional position in the SLAM coordinate system of the two-dimensional feature point (corresponding feature point) that has the correspondence between those images based on the following attitude.

When the coordinates (frame coordinates, already known) of the two-dimensional feature point in the image are (u, v), and the three-dimensional position (unknown) of such a two-dimensional feature point in the SLAM coordinate system is (X, Y, Z), the relationship when those are expressed by the homogeneous coordinates can be expressed as the following formula (1) using a perspective projection matrix P. In this case, the symbol [~] means "equal except a constant multiplication other than zero" (that is, equal or multiple by a constant number (not zero)), and the symbol ['] means "transposition".

$$(u v 1)' \sim P(X Y Z 1)' \tag{1}$$

In the above formula (1), P is a matrix of thee by four, and can be expressed as the following formula (2) by a three-by-three matrix A and external parameters R and t indicating the posture of the image (the frame posture). In this case, (R|t) represents a matrix that arranges the translation column vector t at the right side of the rotation matrix R.

$$P = A(R|t) \tag{2}$$

In the above formula (2), R and t are obtained as the frame posture as explained above. In addition, since an internal parameter A of the camera is defined by the focal point distance and the imaging element size, thus becoming a constant number when the image picker 41 has been chosen beforehand.

When one of the two-dimensional feature points that have the correspondence between the two images is present at frame coordinates ($u_1$, $v_1$) in the first image and at frame coordinates ($u_2$, $v_2$) in the second image, the following formula (3) and formula (4) are satisfied. In this case, I is a unit matrix, 0 is a zero vector, and (L|r) is a matrix that arranges the column vector r at the right side of the matrix L.

$$(u_1 v_1 1)' \sim A(I|0)(XYZ1)' \qquad (3)$$

$$(u_2 v_2 1)' \sim A(R|t)(XYZ1)' \qquad (4)$$

In the above formula (3) and formula (4), since a formula can be made for each of $u_1$, $v_1$, $u_2$, and $v_2$, four formulae can be made, but since unknown values are three that are X, Y, and Z, those unknown values X, Y, and Z can be obtained, and those represent the three-dimensional position of the two-dimensional feature point in the SLAM coordinate system. Note that since the number of formulae is greater than the number of unknown values, for example, X, Y, and Z obtained based on $u_1$, $v_1$, $u_2$ may differ from X, Y, and Z obtained based on $u_1$, $v_1$, $v_2$. According to such a case, a simultaneous linear equation under an excessive condition is established, and in general, there is no solution, but the map creator 12 applies the least square scheme to obtain most probable X, Y, and Z.

When the three-dimensional position (X, Y, Z) of the two-dimensional feature point in the SLAM coordinate system is obtained, the map creator 12 registers (step S214) this position as a Map point in a Map-point database (also referred to as a Map-point DB (DataBase), stored in the map memory 22). As for the element to be registered in the Map-point database, at least "X, Y, Z that represent the three-dimensional position of the two-dimensional feature point in the SLAM coordinate system" and "the feature quantity of the two-dimensional feature point" (the feature quantity obtained by, for example, SIFT).

Next, the map creator 12 determines (step S215) whether or not all two-dimensional feature points (corresponding feature points) that have the correspondence between the two images are registered in the Map-point database, and when all two-dimensional feature points are not registered yet (step S215: NO), the map creator 12 returns the process to the step S213, and when all two-dimensional feature points are registered (step S215: YES), the map creator 12 progresses the process to step S216.

Next, the position estimator 13 initializes (step S216) the NKF (a variable indicating the counter of a key frame (indicating the image to be processed in the subsequent thread)) to zero, and the second image is registered (step S217) as the key frame in a frame database (also referred to as a frame DB (DataBase), and stored in the image memory 21).

The elements to be registered in the frame database are a "key frame number" (the value of the key frame counter NKF at the time of registration), a "posture" (a local device position (translation vector t) in the SLAM coordinate system at the time of image-pickup and a direction (rotation matrix R)), "all extracted two-dimensional feature points", "points which have known three-dimensional positions as the respective Map points among all two-dimensional feature points", and a "feature of the key frame itself". In addition, a "posture in the actual environment measured by the odometry" (a local device position and a direction obtained based on the moved distance by the driver 42 in the actual environment) may also be registered.

In the above elements, the "feature of the key frame itself" is data to make the process of obtaining the image similarity level between the key frames efficient, and in general, the histogram of the two-dimensional feature point in the image is applicable, but the image itself may be taken as the "feature of the key frame itself". In addition, the "posture measured by the odometry in the actual environment" may be expressed by the translation vector t and the rotation matrix R, but in general, since the autonomous movement device 100 moves on the two-dimensional plane, such an element may be simplified to two-dimensional data, and may be expressed by two-dimensional coordinates (X, Y) and a direction $\phi$ with reference to the position (origin) at the time of the start of movement and the direction.

Next, in order to let the map creating thread to know that the key frame has been created, the position estimator 13 sets (step S218) the key frame counter NKF in the key frame queue (where queue employs a first-in and first-out data structure) of the map creating thread.

The initializing process of the local device position estimating thread completes through the above steps, and the position estimator 13 sets (step S219) the estimation status variable to "tracking successful", and in order to obtain a scalar correspondence between the SLAM coordinates and the actual environment coordinates, the position estimator 13 divides the translation distance (obtained by the coordinates in the actual environment) by the odometry by a translation distance d in the SLAM coordinate system estimated through the above process, thereby obtaining a scale S (step S220).

Next, the process progresses to step S221 that is a process when the initialization has been completed through the steps S202, and S203.

An explanation will be given of the process when the initialization has completed. This process is the normal process in the local device position estimating thread, and is the process of causing the position estimator 13 to estimate the present local device position and the direction (the translation vector t in the SLAM coordinate system and the rotation matrix R) in sequence.

First, the position estimator 13 causes the image picker 41 to pick up (step S221) an image, and increments (step S222) the frame counter N. Next, the feature point obtainer 11 obtains (step S223) the two-dimensional feature points contained in the picked-up image by the image picker 41.

Next, the position estimator 13 determines (step S224) whether or not the estimation status variable indicates "tracking successful". When such a variable indicates "tracking successful" (step S224: YES), the corresponding feature-point number obtainer 14 obtains, among the two-dimensional feature points contained in the information on the image that is the information on the last key frame (the image that has the key frame number which is NKF) registered in the frame database, the two-dimensional feature point that has the three-dimensional position already known (which is the Map point already registered in the Map-point database), obtains (step S225) the number (the number of the corresponding feature point) of the two-dimensional feature points (the corresponding feature point) that have the correspondences to the respective feature point obtained in the step S223, and stores the obtained number in the corresponding feature-point number memory 23.

When the estimation status variable does not indicate "tracking successful" (step S224: NO), the corresponding feature-point number obtainer 14 obtains (step S226), among the key frames further previous to the last key frame registered in the frame database (that is, images that have the key frame number which is smaller than NKF), the key frame that has the maximum number of correspondences between the Map point and the obtained feature point in the step S223, and the number of corresponding feature points, and, stores those pieces of information in the corresponding feature-point number memory 23.

Next, the position estimator 13 determines (step S227) whether or not the number of corresponding feature points is greater than a threshold (for example, 30. Hereinafter, referred to as "reference corresponding feature point number"). When the number of corresponding feature points is equal to or smaller than the reference corresponding feature point number (step S227: NO), the precision of the estimated posture by the SLAM scheme would decrease, and thus the position estimator 13 sets (step S230) the estimation status variable to "tracking unsuccessful", and returns the process to the step S202 without a position estimation at this stage.

When the number of corresponding feature points is greater than the reference corresponding feature point number (step S227: YES), the corresponding feature-point number obtainer 14 obtains (step S228) the number (the corresponding feature point number) of the feature points (the corresponding feature points) obtained in the step S223 and having correspondences to the Map point contained in the near key frame (the key frame that has the overlapping feature points to the key frame from which the number of corresponding feature points is obtained by equal to or greater than a predetermined rate (for example, equal to or greater than 30%)) to the key frame from which the number of corresponding feature points is obtained in the step S225 or the step S226, and stores the obtained information in the corresponding feature-point number memory 23.

Next, the position estimator 13 determines (step S229) whether or not the number of corresponding feature points is greater than a threshold (for example, 50. Hereinafter, referred to as a "second reference corresponding feature point number"), and when the number of corresponding feature points is equal to or smaller than the second reference corresponding feature point number (step S229: NO), the position estimator 13 sets (step S230) the estimation status variable to "tracking unsuccessful", and returns the process without a position estimation at this stage. When the number of corresponding feature points is greater than the second reference corresponding feature point number (step S229: YES), the process progresses to step S231.

In the step S231, the position estimator 13 sets (step S231) the estimation status variable to "tracking successful". The position estimator 13 obtains, from the Map-point database, the three-dimensional position $(X_i, Y_i, Z_i)$ of each corresponding feature point obtained in the step S228, and estimates (step S232) the present posture of the local device (the local device position and direction indicated by the translation vector t and the rotation matrix R) using the correspondence relationship with the corresponding feature point contained in the obtained image in the step S221.

This local device posture estimation will be further explained. When the frame coordinates of the corresponding feature point contained in the picked-up image in the step S221 are $(u_i, v_i)$, and the three-dimensional position of such a corresponding feature point is expressed as $(X_i, Y_i, Z_i)$ (where i is a value from 1 to the number of corresponding feature points), values $(ux_i, vx_i)$ obtained by projecting the three-dimensional position $(X_i, Y_i, Z_i)$ of each corresponding feature point in a frame coordinate system through the following formula (5) should be ideally consistent with the frame coordinates $(u_i, v_i)$.

$$(ux_i, vx_i, 1)' \sim A(R|t)(X_i Y_i Z_i)' \quad (5)$$

In practice, however, since $(X_i, Y_i, Z_i)$ and $(u_i, v_i)$ contain errors, $(ux_i, vx_i)$ is hardly consistent with $(u_i, v_i)$ in reality. In addition, although the unknown values are R and t only (in a three-dimensional space, each becomes three-dimensional, and the number of unknown values is 3+3=6), the number of the formulae is twice as much as the number of corresponding feature points (this is because there is a corresponding formula to each of u, v in the frame coordinates per a corresponding feature point), a simultaneous linear equation under the excessive condition is established, and thus the solution should be obtained by the least square scheme as explained above. More specifically, the position estimator 13 is to obtain the posture (the translation vector t and the rotation matrix R) that minimizes a cost function E1 expressed by the following formula (6). This becomes the local device posture (the local device position and the direction expressed by the translation vector t and the rotation matrix R, respectively) in the SLAM coordinate system obtained by the SLAM scheme. The position estimator 13 estimates (step S232) the posture of the local device in this way.

[Formula 1]

$$E1 = \sum_{i=1}^{\text{Number of corresponding feature points}} ((u_i - ux_i)^2 + (v_i - vx_i)^2) \quad (6)$$

Since the present posture of the local device (the translation vector t and the rotation matrix R) in the SLAM coordinate system has been obtained, the position estimator 13 multiplies such a posture by the scale S, thereby obtaining (step S233) a Visual Odometry (VO). The VO is utilizable as the local device position and the direction in the actual environment.

Next, the position estimator 13 determines (step S234) whether or not the local device has moved by equal to or greater than the predetermined distance (for example, 1 m, hereinafter, referred to as a "reference translation distance") from the local device position when the last key frame (the image that has the key frame number of NKF) registered in the frame DB, and when the local device has moved by equal to or greater than the reference translation distance (step S234: YES), the position estimator 13 increments (step S235) the key frame counter NKF, and then registers (step S236) the present frame as the key frame in the frame DB. When the local device has moved by less than the reference translation distance (step S234: NO), the position estimator 13 returns the process to the step S202.

In this case, the moved distance of the local device to be compared with the reference translation distance may be a translation distance (an absolute vector value (square root of sum of squares of the element) that is a difference in the translation vector between both frames) from the last frame to the present frame obtained by the odometry, or may be obtained by the VO as explained above. The details to be registered in the frame DB are the "key frame number", the "posture", "all extracted two-dimensional feature points", the "two-dimensional feature points that have known three-dimensional position as the Map points among all two-dimensional feature points", and the "feature of the key frame itself" as explained above.

Subsequently, in order to inform the map creating thread of the creation of the new key frame, the position estimator 13 sets (step S237) the key frame counter NFK in the key frame queue of the map creating thread. Next, the position estimator 13 returns the process to the step S202. Note that the key frame counter NFK, the scale S, the Map-point DB, the frame DB, and the corresponding feature point number are stored in the memory 20 in such a way that the respective values are also referable in other threads.

Figure 5:
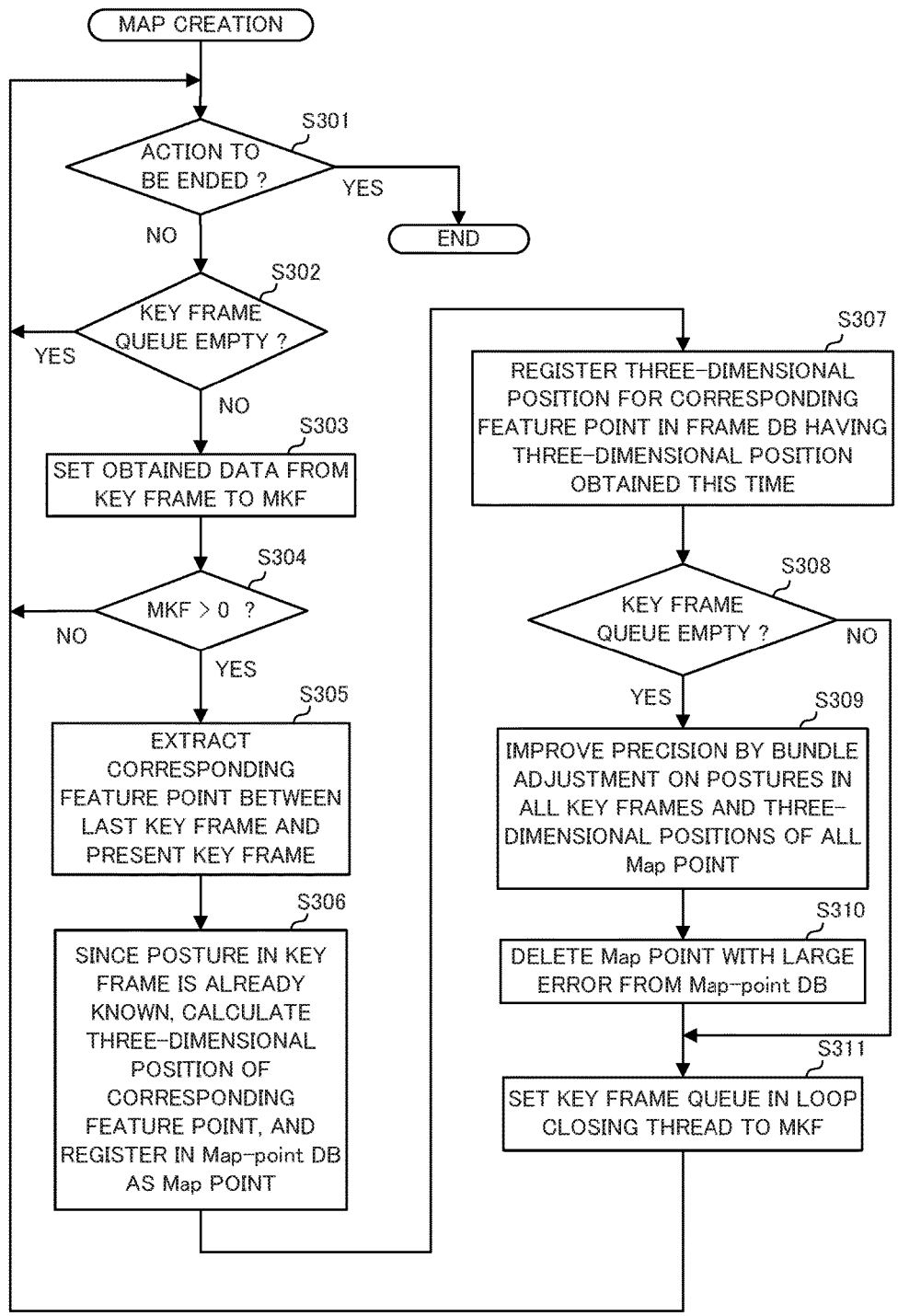
FIG. 5 is a flowchart for a process in a map creating thread of the autonomous movement control process according to the embodiment.

Next, an explanation will be given of the map creating thread launched in the step S103 of the main flow (see FIG. 3) for the autonomous movement device 100 with reference to FIG. 5. In this thread, the map creator 12 calculates the three-dimensional position of the corresponding feature point in the key frame, and creates the map information (Map-point DB).

First, the map creator 12 determines (step S301) whether or not to end the action (step S301). When the action is to be ended (step S301: YES), the action is ended, and when the action is not to be ended (step S301: NO), the map creator 12 determines (step S302) whether or not the key frame queue is empty. When the key frame queue is empty (step S302: YES), the map creator 12 returns the process to the step S301, and when the key frame queue is not empty (step S302: NO), the map creator 12 takes out data from the key frame queue and sets (step S303) to the MKF (a variable indicating the key frame number of the key frame to be processed in the map creating thread). The map creator 12 determines (step S304) whether or not the MKF is zero, and when the MKF is zero (step S304: NO), the map creator 12 returns the process to the step S301, and waits for until the data is entered in the key frame queue. When the MKF is equal to or greater than 1 (step S304: YES), the process progresses to the following process.

The map creator 12 refers to the frame DB, and extracts (step S305) the two-dimensional feature point (the corresponding feature point) that has the correspondence between the previous frame (the key frame that has the key frame number of MKF−1) and the present key frame (the key frame that has the key frame number of MKF). Since the postures (the translation vectors t and the rotation matrices R) of the respective key frames are also registered in the frame DB, the three-dimensional position of the corresponding feature point is calculatable by the same process at the time of the initializing process in the local device position estimating thread. The map creator 12 registers (step S306) the corresponding feature point which has the calculated three-dimensional position in the Map-point DB as the Map point. The map creator 12 also registers (step S307), in other key frames of the frame DB, the three-dimensional position for the two-dimensional feature point that has the calculated three-dimensional position at this time.

Note that when the extracted corresponding feature point by the map creator 12 has been already registered in the Map-point DB, the three-dimensional position calculation may be skipped and the process for the next corresponding feature point (which is not registered in the Map-point DB yet), or a three-dimensional position calculation may be executed again, and the three-dimensional position already registered in the Map-point DB or the three-dimensional position of the corresponding feature point in the frame DB may be updated.

Next, the map creator 12 determines (step S308) whether or not the key frame queue is empty. When the key frame queue is empty (step S308: YES), a bundle adjustment process is performed on the postures of all key frames and the three-dimensional positions of all Map points so as to improve the precision (step S309). Subsequently, upon the bundle adjustment process, when a Map point that has a large error is found, such a point is deleted (step S310) from the Map-point DB, and the process progresses to step S311. When the key frame queue is not empty (step S308: NO), the process directly progresses to the step S311 without any action.

In the step S311, the map creator 12 sets (step S311) the MKF in the key frame queue of the loop closing thread, and returns the process to the step S301.

Note that the bundle adjustment process is a non-linear optimization scheme that simultaneously estimates both the camera posture (the key frame posture) and the three-dimensional position of the Map point, and performs an optimization so as to minimize an error produced when the Map point is projected on the key frame.

By executing this bundle adjustment process, the precision of the key frame posture and that of the three-dimensional position of the Map point are improved. When, however, this process is not executed, simply improvement of the precision is not accomplished, which does not bring any technical problem. Hence, execution of this process is not always necessary every time there is no other process (when, for example, the key frame queue is empty).

In addition, by executing the bundle adjustment process, a Map point that has a larger error than the predetermined value when projected on the key frame may be found. Such a Map point with a large error affects the SLAM estimation. Hence, such a Map point is deleted in the step S310 from the Map-point DB. Note that instead of the deletion of the Map point from the Map-point DB, a flag to identify that such a Map point has a large error and needs an attention may be set up in the Map-point DB.

Figure 6:
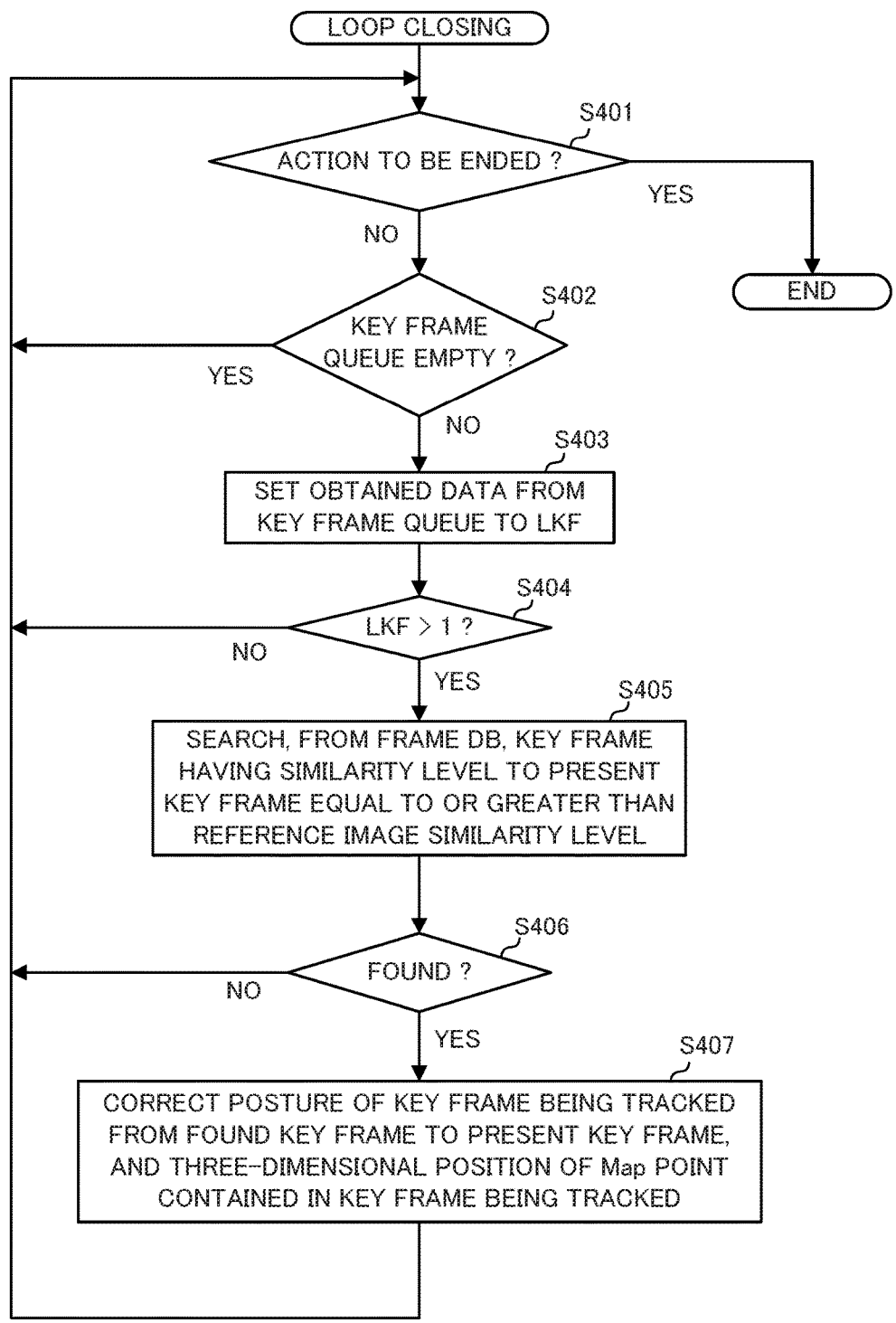
FIG. 6 is a flowchart for a process in a loop closing thread of the autonomous movement control process according to the embodiment.

Next, an explanation will be given of the loop closing thread launched in the step S104 in the main flow (see FIG. 3) for the autonomous movement device 100 with reference to FIG. 6. In this thread, the controller 10 keeps checking whether or not the loop closing process is executable, and executes the loop closing process when determining that the loop closing process is executable. Note that the loop closing process is to correct, based on a difference between the posture value when reached this site last time and the present posture value, the key frame being tracked up to the present time after reached this site last time and the three-dimensional position of the relevant Map point when the controller 10 recognized that the local device has returned to the site where the local device once reached in past.

First, the controller 10 determines (step S401) whether or not to end the action. When the action is to be ended (step S401: YES), the action is ended. When the action is not to be ended (step S401: NO), the controller 10 determines whether or not the key frame queue is empty (step S402). When the key frame queue is empty (step S402: YES), the controller 10 returns the process to the step S401, and when the key frame queue is not empty (step S402: NO), the controller 10 takes out data from the key frame queue, and sets (step S403) in an LKF (a variable indicating the key frame number of the key frame to be processed in the loop closing thread). Next, the controller 10 determines (step S404) whether or not the LKF is greater than 1. When the LKF is zero or 1 (step S404: NO), the controller 10 returns the process to the step S401, and waits for until the data is entered in the key frame queue. Next, when the LKF is equal to or greater than 2 (step S404: YES), the following process is executed.

The controller 10 refers to the frame DB, and searches (step S405), from the frame DB, the key frame that has a similarity level which is of the "feature of the key frame itself" relative to the present key frame (the key frame that has the key frame number of LKF), and which is equal to or greater than a predetermined similarity level (for example, 0.9, hereinafter, referred to as the "reference image similarity level"). In this case, when the feature of the image (the key frame) is represented by the feature vector, the similarity level may be the absolute value of the inner product of the feature vectors of the two images normalized to 1, or may be the inner product of the absolute values (square root of sum of squares of the element) of the respective feature vectors of the two images normalized to 1. In addition, the inverse number of the distance (square root of sum of squares) of the feature vectors (the absolute value normalized to 1) of the two images may be adopted as the similarity level.

The controller 10 determines (step S406) whether or not the key frame that has the similarity level of the "feature of the key frame itself" which is equal to or greater than the reference image similarity level. When no such a frame is found (step S406: NO), the process returns to the step S401, and when such a frame is found (step S406: YES), the key frame posture being tracked from the found key frame to the present key frame, and the three-dimensional position of the Map point in the key frame being tracked are corrected (step S407). For example, the controller 10 corrects the posture of the present key frame to the posture of the found key frame. Next, using a difference between the posture of the found key frame and that of the present key frame, the posture of each key frame being tracked from the found key frame and up to the present key frame is corrected linearly. In addition, the three-dimensional position of the Map point contained in each key frame is also corrected in accordance with the correction amount of the posture of each key frame. Subsequently, the process returns to the step S401.

Next, an explanation will be given of the movement control in the step S107 of the main flow (see FIG. 3) for the autonomous movement device 100. This process is basically to give an action instruction to the driver 42 for the autonomous movement to the destination, but to decrease the speed, stop the local device, or to change the movement direction when the number of corresponding feature points decreases, thereby increasing the number of corresponding feature points.

Note that in the process for the movement control, the two variables that are the movement status variable simply explained in the step S101, and the latest record number are applied. Hence, those variables will be further explained. The movement status variable takes any value that is "normal", "low speed", "stop", or "return", and is applied to change the moving speed and the movement direction. In regards to the latest record number, the number of movement records stored in the movement record memory 24 is set, and is applied to determine whether or not to set another destination after the "return" movement to be explained later.

Figure 7:
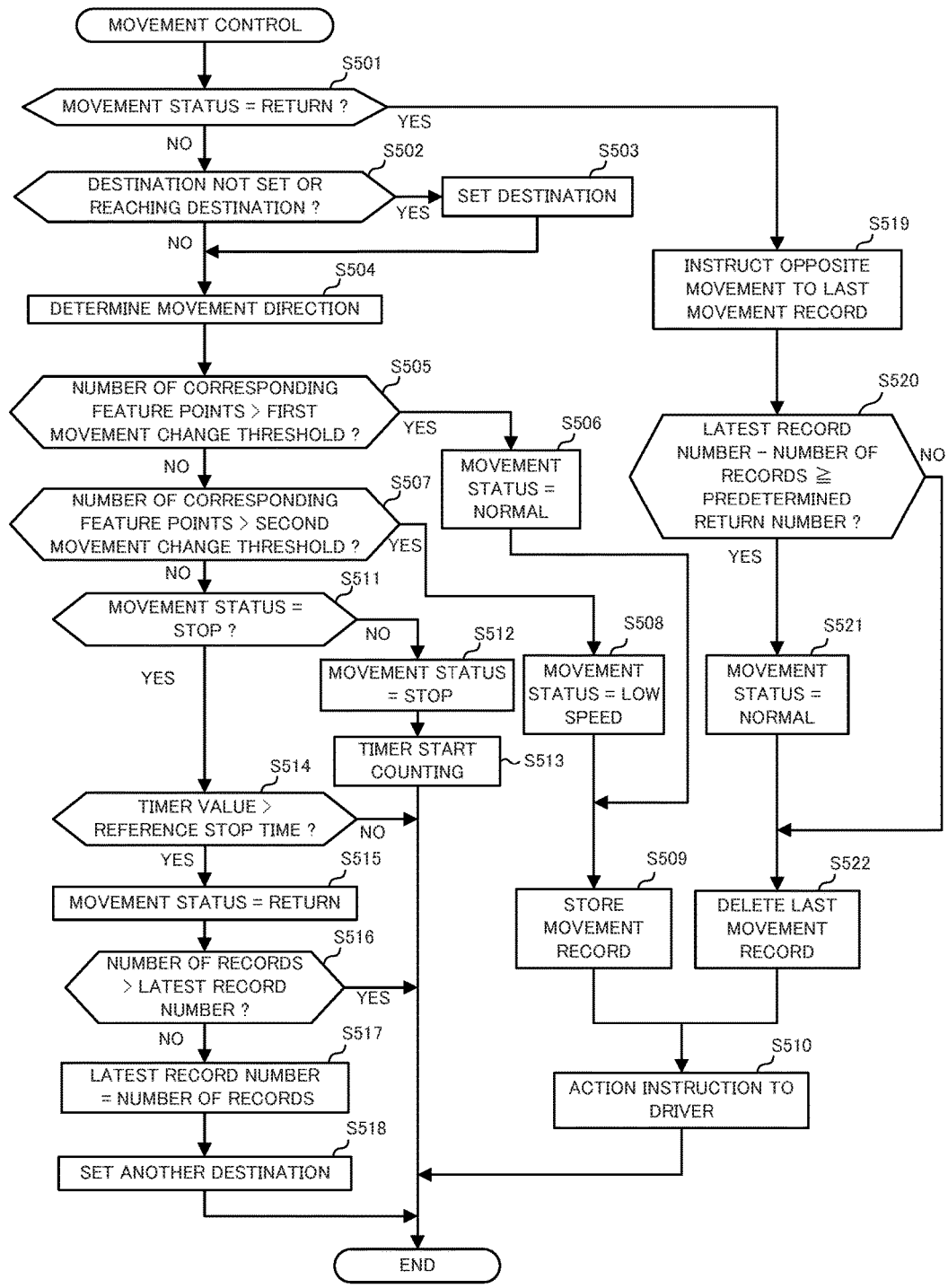
FIG. 7 is a flowchart for a movement control in the autonomous movement control process according to the embodiment.

This movement control will be explained below with reference to FIG. 7. First, the movement direction-and-speed changer 15 determines (step S501) whether or not the movement status variable indicates "return". When the movement status variable indicates "return" (step S501: YES), the process progresses to step S519. The process subsequent to the step S519 will be explained later.

When the movement status variable does not indicate "return" (step S501: NO), the movement direction-and-speed changer 15 determines (step S502) whether the destination is not set yet or the local device has reached the destination. When the destination is not set yet or the local device has reached the destination (step S502: YES), the controller 10 sets (step S503) the destination, and progresses the process to step S504. In the step S503, the controller 10 corresponds to a destination setter. When the destination is set and the local device has not reached the destination (step S502: NO), the controller 10 progresses the process to the step S504.

In the step S504, the movement direction-and-speed determiner 16 determines (step S504) the movement direction based on the present position, the destination, and the map information stored in the map memory 22.

Next, the movement direction-and-speed changer 15 determines (step S505) whether or not the number of corresponding feature points stored in the corresponding feature-point number memory 23 is greater than a first movement change threshold (for example, 100). When such a number is greater than the first movement change threshold (step S505: YES), the movement status variable is set to "normal" (step S506), and the process progresses to step S509.

When the number of corresponding feature points stored in the corresponding feature-point number memory 23 is equal to or smaller than the first movement change threshold (step S505: NO), the movement direction-and-speed changer 15 determines (step S507) whether or not the number of corresponding feature points is greater than a second movement change threshold (for example, 30). When such a number is greater than the second movement change threshold (step S507: YES), the movement direction-and-speed changer 15 sets (step S508) the movement status variable to "low speed", and progresses the process to step S509. Note that the first movement change threshold and the second movement change threshold both may be set to arbitrary values that are equal to or greater than several tens, but the first movement change threshold should be set to be larger than the second movement change threshold.

In the step S509, the movement direction-and-speed determiner 16 stores, in the movement record memory 24, the movement direction determined in the step S504 and the movement distance obtainable based on the speed indicated by the value of the movement status variable. Instead of the movement direction and the movement distance, the local device posture (the position (the translation vector t) and the direction (the rotation matrix R)) obtained in the local device position estimating thread may be stored in the movement record memory 24.

Next, the movement direction-and-speed determiner 16 drives (step S510) the driver 42 in accordance with the movement direction determined in the step S504 and the speed indicated by the value of the movement status variable, and ends the process.

When the number of corresponding feature points stored in the corresponding feature-point number memory 23 is equal to or smaller than the second threshold (step S507: NO), the movement direction-and-speed changer 15 determines (step S511) whether or not the movement status variable indicates "stop". When the movement status variable does not indicate "stop" (step S511: NO), the movement direction-and-speed changer 15 sets (step S512) the movement status variable to "stop", and causes the timer in the controller 10 to start counting (step S513), and ends the process.

When the movement status variable indicates "stop" (step S511: YES), the movement direction-and-speed changer 15 determines (step S514) whether or not the value of the timer started in the step S513 is becoming greater than a reference stop time (for example, 10 seconds). When the timer value is equal to or smaller than the reference stop time (step S514: NO), the movement direction-and-speed changer 15 ends the process.

When the timer value is greater than the reference stop time (step S514: YES), the movement direction-and-speed changer 15 sets (step S515) the movement status variable to "return", and determines (step S516) whether or not the number of stored records in the movement record memory 24 at this time point is greater than the latest record number. When the number of stored records in the movement record memory 24 at this time point is greater than the latest record number (step S516: YES), the movement direction-and-speed changer 15 ends the process.

When the number of stored records in the movement record memory 24 at this time point is equal to or smaller than the latest record number (step S516: NO), the controller 10 sets (step S517) the latest record number to the number of stored records in the movement record memory 24, and sets (step S518) another destination. In the step S518, the controller 10 corresponds to a destination changer. After the step S518, the controller 10 ends the process.

When the movement status variable indicates in the step S501 "return" (step S501: YES), the movement direction-and-speed determiner 16 determines, as the movement direction at the time of next movement, the opposite direction to the last movement direction stored in the movement record memory 24, and determines, as the movement distance at the time of next movement, the last movement distance stored in the movement record memory 24 (step S519). When the information stored in the movement record memory 24 is the local device position and the direction, the movement direction-and-speed determiner 16 determines (step S519) the movement direction and movement distance at the time of next movement to return to the local device position and the direction stored in the movement record memory 24 in the last time as the movement direction and the movement distance from the present position at the time of next movement.

Next, in order to determine whether or not a return movement is made by what corresponds to the predetermined number of records, the movement distance-and-speed changer 15 determines (step S520) whether or not the value obtained by subtracting the number of stored records in the movement record memory 24 at this time point from the latest record number is equal to or greater than a predetermined return number (for example, 10). When the obtained number is smaller than the predetermined return number (step S520: NO), in order to still maintain the "return" movement, the process directly progresses to step S522.

When the obtained number is equal to or greater than the predetermined return number (step S520: YES), in order to end the "return" movement, the movement distance-and-speed changer 15 sets (step S521) the movement status variable to "normal", and progresses the process to step S522.

In the step S522, the movement distance-and-speed changer 15 deletes (step S522) the last movement record stored in the movement record memory 24. Next, the movement direction-and-speed determiner 16 drives (step S510) the driver 42 in accordance with the movement direction determined in the step S504 and the speed indicated by the value of the movement status variable, and ends the process.

As for the destination setting in the step S503, for example, information on the destination is obtained via the communicator 44 to set the destination. At this time, the communicator 44 corresponds to a destination obtainer. In addition, as for the another destination setting in the step S518, for example, information on another destination is also obtained via the communicator 44 to set another destination.

A specific example will be explained with reference to FIG. 8 in which the autonomous movement device 100 stops, returns, and the like, by repeatedly executing the above processes as the movement control process in the step S107 of the main flow (see FIG. 3). When the number of corresponding feature points is greater than the second movement change threshold, the autonomous movement device 100 keeps moving toward the destination (1. step S506 or S508 in FIG. 8). When the number of corresponding feature points becomes equal to or smaller than the second movement change variable, the autonomous movement device 100 stops (2. step S512 in FIG. 8).

By the map creating thread launched as a background task while the autonomous movement device 100 is stopping, the Map points are continuously registered in the Map-point database, and thus when the number of corresponding feature points becomes greater than the second movement change threshold, the autonomous movement device 100 starts again the movement (after the process is once ended at step S514: NO or step S506 or S508 in the subsequent movement control). When, however, the autonomous movement device 100 is stopping by the reference stopping time but the number of corresponding feature points is still equal to or smaller than the second movement change threshold, the return movement is made by what corresponds to the predetermined return number (3. steps S515, S520 in FIG. 8). Note that in FIG. 8, the predetermined return number is set to two.

Figure 8:
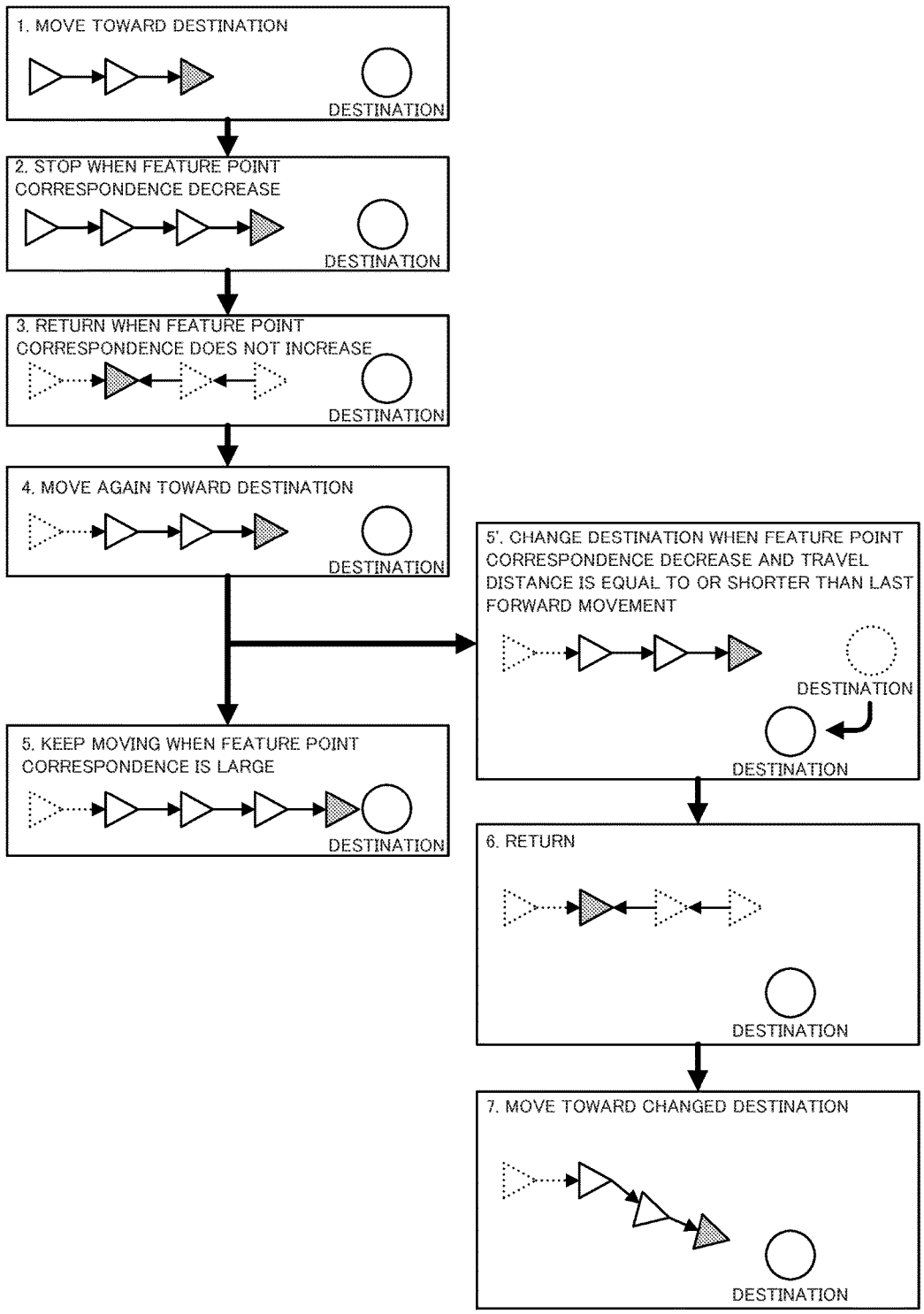
FIG. 8 is a diagram illustrating a specific example movement of the autonomous movement device according to the embodiment.

When the return movement is made by what corresponds to the predetermined return number, the autonomous movement device 100 starts again moving toward the destination (4. in FIG. 8). When the number of corresponding feature points is being greater than the second movement change threshold while the autonomous movement device 100 is moving toward the destination again, this movement is still maintained (5. step S506 or S508 in FIG. 8). When, however, the autonomous movement device 100 does not move forward beyond the record of the last forward movement, even if the autonomous movement device 100 attempts to move to the destination, since the number of corresponding feature points is small, the autonomous movement device 100 is to return by many times during the movement toward the destination. Hence, the autonomous movement device 100 changes the destination (5'. step S518 in FIG. 8), and makes the return movement by what corresponds to the predetermined return number (6. step S520 in FIG. 8). After the return movement by what corresponds to the predetermined return number, the autonomous movement device 100 moves toward another changed destination (7. step S506 or S508 in FIG. 8).

By performing the above movement control, the status in which the local device position is estimatable in the local device position thread is maintained for a long time. Note that in the step S508 in FIG. 7, the determined movement direction in the step S504 may be changed. As for such a change, the direction may be changed to a random direction, or the autonomous movement device 100 may turn around by 360 degrees at the present position while picking up surrounding images, and may change the movement direction to the direction of the image that has the largest number of corresponding feature points among the picked-up images. In addition, "another destination" set in the step S518 in FIG. 7 may be changed like a first candidate, a second candidate, and a third candidate in sequence when there are multiple destinations. Still further, when there are multiple routes to the same destination, the route may be changed without a change to the destination. Yet still further, when the autonomous movement device 100 is moving freely without a particular destination, the destination may be set at random.

When there is no particular destination, a movement toward the direction in which the number of feature points is large is desirable. As for such a movement scheme, for example, the autonomous movement device 100 may turn around by 360 degrees at the present position while picking up an image in the direction to be the destination candidate for each predetermined angle, set the direction of the image having the largest number of feature points among the picked-up images as the new destination, and move toward such a direction. In this case, since the controller 10 selects the destination candidate for each predetermined angle, the controller 10 corresponds to a destination candidate selector. In addition, since the feature point obtainer 11 obtains the feature points from the image in the direction of the destination candidate, the feature point obtainer 11 corresponds to a destination candidate feature point obtainer. Execution of such processes increases the possibility that enables the autonomous movement device 100 to move in the direction in which the number of corresponding feature points increases more than the at-random movement, facilitating a recovery to a status in which the local device position is estimatable.

The reasons why the number of corresponding feature points decreases are, in addition to the surrounding scene itself containing a small number of feature points, the dark surrounding that needs a long exposure time, causing an image blurring picked up by the image picker 41. According to the process in FIG. 7, when the number of corresponding feature points decreases, the speed is decreased or the autonomous movement device 100 is stopped so as to accomplish the movement control that reduces the image blurring during an image pickup. With respect to this point, even if the corresponding feature-point number obtainer 14 has not obtained the corresponding feature point number, the surrounding brightness may be obtained by an unillustrated brightness sensor or the image picker 41, and the speed may be decreased or the autonomous movement device 100 may be stopped when the obtained brightness is darker than a predetermined brightness so as to obtain an image that has little blurring.

Note that the respective functions of the autonomous movement device 100 according to the present disclosure are realizable by a general computer like a Personal Computer (PC). More specifically, in the above embodiment, the explanation has been given of an example case in which the program for the autonomous movement control process executed by the autonomous movement device 100 is stored in the ROM of the memory 20 beforehand. However, the program may be distributed in a manner recorded in a non-transitory computer-readable recording medium, such as a flexible disk, a Compact Disc Read Only Memory (CD-ROM), a Digital Versatile Disc (DVD), or a Magneto-Optical disc (MO), and may be read and installed in a computer to accomplish the computer that realizes the respective functions explained above.

Figure 9:
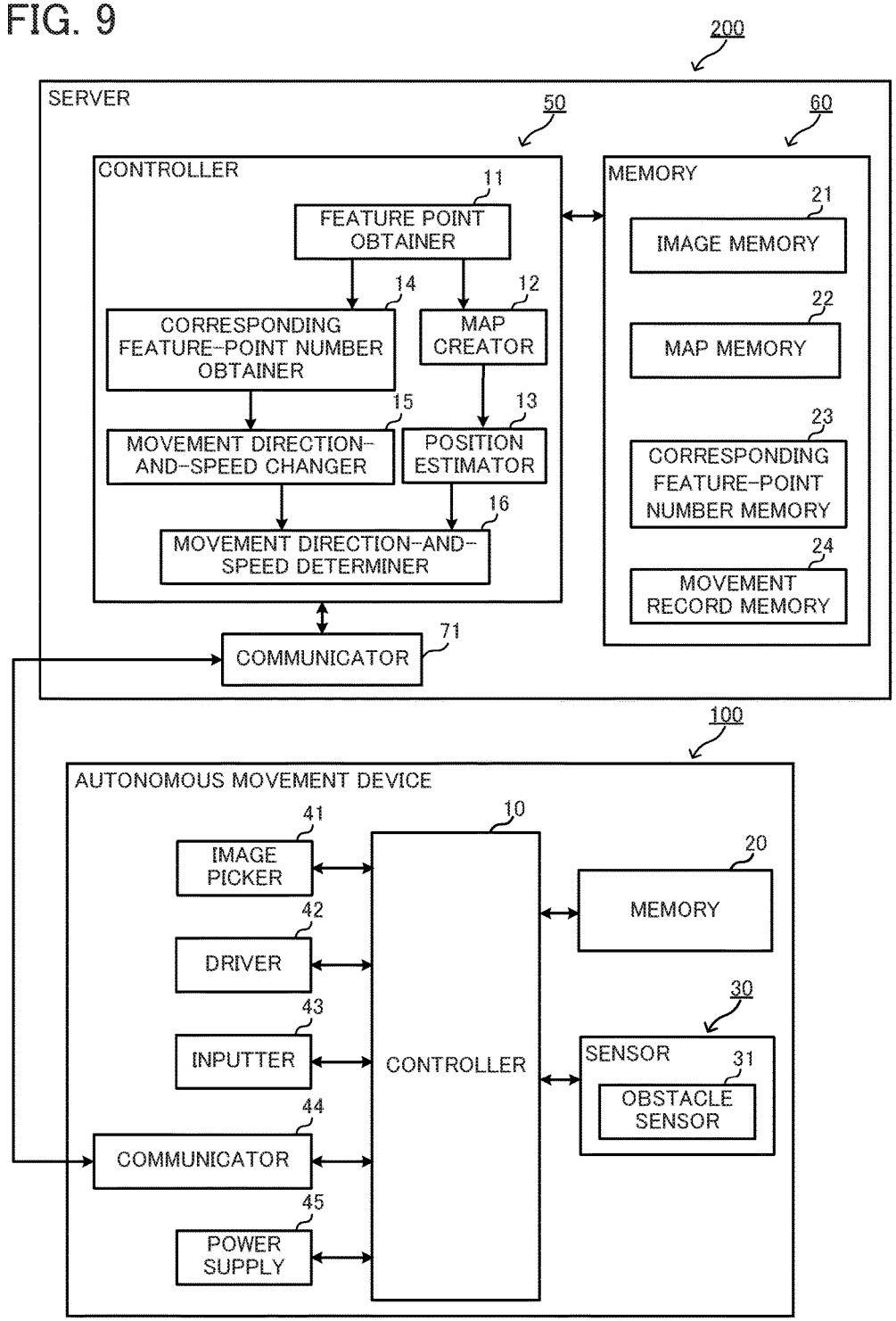
FIG. 9 is a diagram illustrating an example structure in which a part of a controller, and the like, is provided in an external server.

This computer may be built in the autonomous movement device 100, or may be provided individually from the autonomous movement device 100. That is, as illustrated in FIG. 9, the controller and the memory may be provided in an external server 200. Based on a cloud-computing technology, the controller 10 of the autonomous movement device 100 may transmit data obtained by the image picker 41, the sensor 30, and the like, to the external server 200 via the communicator 44, the server 200 may perform arithmetic process, the controller 10 may receive the arithmetic process result by the server 200 via the communicator 44, and may drive the driver 42. In FIG. 9, although a controller 50 of the server 200 includes the feature point obtainer 11, the map creator 12, the position estimator 13, the corresponding feature-point number obtainer 14, the movement direction-and-speed changer 15, and the movement direction-and-speed determiner 16, either the controller 50 of the server 200 and the controller 10 of the autonomous movement device 100 may include the respective components. Whether the controller 50 of the server 200 or the controller 10 of the autonomous movement device 100 includes the respective components is optional.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous movement device comprising:
a map memory;
a hardware processor which is configured to:
   control an autonomous movement of the autonomous movement device based on information on a plurality of images picked up by a camera;
   obtain a feature point in an image among the plurality of images picked up by the camera by analyzing the image;
   store, in the map memory, a position of the obtained feature point; and
   obtain a corresponding feature point number that is a number of correspondences between a presently obtained feature point and a previously obtained feature point whose position is stored in the map memory; and
an image memory sequentially storing an image picked up by the camera,
wherein the hardware processor is further configured to estimate a local device position of the autonomous movement device based on the position of the feature point stored in the map memory,
wherein the hardware processor determines whether an estimation status of the local device position is a tracking successful status or a tracking unsuccessful status based on the obtained corresponding feature point number,
wherein the hardware processor obtains a corresponding feature point number by referring to a predetermined image among a plurality of images sequentially stored in the image memory when the estimation status of the local device position is determined to be in the tracking successful status, and when the estimation status of the local device position is determined to be in the tracking unsuccessful status, the hardware processor obtains a corresponding feature point number by referring to a previous image which is an image stored prior to the predetermined image among the plurality of images sequentially stored in the image memory, and wherein the hardware processor controls the autonomous movement in accordance with the obtained corresponding feature point number.

2. The autonomous movement device according to claim 1, wherein:

the hardware processor obtains a corresponding feature point number by referring to a feature point in a neighboring image which is an image having a predetermined relationship with one of the predetermined image and the previous image, among the plurality of images sequentially stored in the image memory, when the obtained corresponding feature point number is equal to or larger than a predetermined reference corresponding feature point number; and when the corresponding feature point number, obtained by referring to the neighboring image, is equal to or larger than a predetermined second reference corresponding feature point number, the hardware processor determines that the position of the local device is in the tracking successful status and stores the corresponding feature point number and the position of the feature point in the map memory.

3. The autonomous movement device according to claim 2, wherein the hardware processor changes a movement direction when the obtained corresponding feature point number is equal to or less than a movement change threshold which is larger than the second reference corresponding feature point number.

4. The autonomous movement device according to claim 2, wherein the hardware processor reduces a movement speed when the obtained corresponding feature point number is equal to or less than a movement change threshold which is larger than the second reference corresponding feature point number.

5. The autonomous movement device according to claim 3, wherein the hardware processor sets the movement speed to zero for a predetermined time, when the obtained corresponding feature point number is equal to or less than the second reference corresponding feature point number.

6. The autonomous movement device according to claim 5, further comprising:

a movement record memory storing a past movement record, wherein, when the obtained corresponding feature point number is equal to or less than the second reference corresponding feature point number, even after the predetermined time has elapsed after having set the movement speed to zero, the hardware processor sets a movement direction based on the movement record stored in the movement record memory so as to return to a past position.

7. The autonomous movement device according to claim 1, wherein:

the hardware processor is configured to obtain a surrounding brightness in a surrounding environment; and the hardware processor reduces the moving speed or stops the autonomous movement device when the surrounding brightness is darker than a predetermined brightness.

8. The autonomous movement device according to claim 6, wherein:

the hardware processor is configured to obtain a destination for a movement; and the hardware processor sets the movement direction so as to move toward the obtained destination, after the autonomous movement device has returned to the past position.

9. The autonomous movement device according to claim 8, wherein the hardware processor is configured to, after the autonomous movement device has returned to the past position from a first position, and then moved toward the obtained destination, when the obtained corresponding feature point number becomes equal to or smaller than the reference corresponding feature point number, change the obtained destination before the autonomous movement device has moved beyond the first position.

10. The autonomous movement device according to claim 1, wherein the hardware processor is configured to:

select a plurality of destination candidates;

obtain the feature point from images in directions of the selected destination candidates; and set a destination to the destination candidate in which a number of the obtained feature points is maximum among the plurality of destination candidates.

11. An autonomous movement method, comprising:

controlling an autonomous movement based on information on a plurality of images picked up by a camera;

obtaining a feature point in an image among the plurality of images picked up by the camera by analyzing the image;

storing, in a map memory, a position of the obtained feature point;

obtaining a corresponding feature point number that is a number of correspondences between a presently obtained feature point and a previously obtained feature point whose position is stored in the map memory;

sequentially storing an image picked up by the camera in an image memory;

estimating a local device position based on the position of the feature point stored in the map memory;

determining whether an estimation status of the local device position is a tracking successful status or a tracking unsuccessful status based on the obtained corresponding feature point number;

obtaining a corresponding feature point number by referring to a predetermined image among a plurality of images sequentially stored in the image memory when the estimation status of the local device position is determined to be in the tracking successful status, and obtaining a corresponding feature point number by referring to a previous image which is an image stored prior to the predetermined image among the plurality of images sequentially stored in the image memory when the estimation status of the local device position is determined to be in the tracking unsuccessful status; and controlling the autonomous movement in accordance with the obtained corresponding feature point number.

12. A nontransitory computer readable storage medium having stored thereon a program that, when executed, cause one or more processors to perform functions comprising:

controlling an autonomous movement based on information on a plurality of images picked up by a camera;

obtaining a feature point in an image among the plurality of images picked up by the camera by analyzing the image;

storing, in a map memory, a position of the obtained feature point;

obtaining a corresponding feature point number that is a number of correspondences between a presently obtained feature point and a previously obtained feature point whose position is stored in the map memory;

sequentially storing an image picked up by the camera in an image memory;

estimating a local device position based on the position of the feature point stored in the map memory;

determining whether an estimation status of the local device position is a tracking successful status or a tracking unsuccessful status based on the obtained corresponding feature point number;

obtaining a corresponding feature point number by referring to a predetermined image among a plurality of images sequentially stored in the image memory when the estimation status of the local device position is determined to be in the tracking successful status, and obtaining a corresponding feature point number by referring to a previous image which is an image stored prior to the predetermined image among the plurality of images sequentially stored in the image memory when the estimation status of the local device position is determined to be in the tracking unsuccessful status; and controlling the autonomous movement in accordance with the obtained corresponding feature point number.

* * * * *